United States Patent [19]

Wissgott

[11] Patent Number: 4,784,866
[45] Date of Patent: Nov. 15, 1988

[54] PROCESS OF ALKALIZATION OF COCOA IN AQUEOUS PHASE

[75] Inventor: Ulrich Wissgott, La Tour-de-Peilz, Switzerland

[73] Assignee: Nestec S. A., Vevey, Switzerland

[21] Appl. No.: 914,053

[22] Filed: Oct. 1, 1986

[30] Foreign Application Priority Data

Nov. 7, 1985 [CH] Switzerland .......................... 4783/85

[51] Int. Cl.$^4$ .............................................. A23G 1/00
[52] U.S. Cl. .................................... 426/262; 426/593; 426/631
[58] Field of Search .............. 426/593, 256, 262, 253, 426/254, 270, 306, 631, 431, 263

[56] References Cited

U.S. PATENT DOCUMENTS

| | | | |
|---|---|---|---|
| 2,512,663 | 6/1950 | Masurovsky | 426/431 |
| 3,056,677 | 10/1962 | Colten et al. | 426/270 |
| 3,707,382 | 12/1972 | Rostagno | 426/593 |
| 3,778,519 | 12/1973 | Taralli et al. | 426/631 |
| 3,868,469 | 2/1975 | Chalen | 426/593 |
| 3,997,680 | 12/1976 | Chalen | 426/631 |
| 4,349,579 | 9/1982 | Raboud et al. | 426/631 |
| 4,704,292 | 11/1987 | Kattenberg | 426/593 |

FOREIGN PATENT DOCUMENTS 0066304  9/1986  European Pat. Off.

OTHER PUBLICATIONS

Minifie, 1980 Chocolate, Cocoa and Confectionery, AVI Publishing, Westport, CT, pp. 45, 47–51.

Primary Examiner—Donald E. Czaja
Assistant Examiner—Carolyn Paden
Attorney, Agent, or Firm—Vogt & O'Donnell

[57] ABSTRACT

For improving the taste and dispersibility of cocoa and for obtaining alkalized cocoa to which is imparted red coloration for obtaining a wide range of colors in shades of red and brown, cocoa meal or liquor and an alkalizing agent in aqueous phase are mixed and heated in an enclosed vessel under a pressure of from above 1 atmosphere to 3 atmospheres at a temperature below 110° C. without evaporation of water while introducing an oxygen-containing gas into the vessel during at least a part of the mixing and heating for maintaining the excess pressure. After the cocoa is alkalized, water is evaporated from it.

16 Claims, No Drawings

PROCESS OF ALKALIZATION OF COCOA IN AQUEOUS PHASE

BACKGROUND OF THE INVENTION

This invention relates to a process for alkalizing cocoa in the aqueous phase to improve its colour, taste and dispersibility and to enable a wide range of colours to be obtained therefrom.

FR-PS No. 2 445 698 already describes a process for solubilizing (or alkalizing) cocoa. To explain the process according to this Patent in more detail, the various phases involved in the production of soluble cocoa need to be specified: after cleaning and sorting, the raw nibs are crushed and degermed, the product obtained representing the meal.

This meal is then subjected to pregrinding, as a result of which the cells are broken and release the cocoa butter, the product obtained representing the ground meal or cocoa liquor. This ground meal is then converted into pure paste by fine grinding. Finally, the cocoa butter is separated from this pure paste and it is from the cakes obtained that the cocoa powder is prepared. The cocoa may be roasted in the form of the nibs, the meal, the ground meal or the pure paste. The process according to the above-mentioned French Patent may be applied both to the green or roasted ground meal and to the pure paste or the cakes. In this process, steam and a concentrated solution of an alkali carbonate are continuously injected under pressure into the cocoa mass in a tube, the carbonate is left to react with the cocoa mass for 30 to 80 seconds at a temperature of at least 120° C., the mixture is subjected to sudden expansion and then dried with stirring. Apart from the disadvantage of the relatively high alkalizing temperature, it is not possible by this process to produce cocoa powders in a wide range of colours, particularly in shades of red or red-brown. Now, cocoas produced in colours such as these are very much in demand at the present time because they have a strong colouring power, thus eliminating the need to use food colorants which are prohibited in many countries. Obviously, these cocoas also have other advantages which will be explained hereinafter.

EP-PS No. 66 304 relates to a cocoa powder having this red or red-brown colour. The powder in question is obtained by alkalizing cocoa powder with approximately 75% water for 4 to 24 hours at a temperature of from 65° to 90° C., the water being replaced as its evaporates. The major disadvantage of this process is that it involves a long alkalizing time and a high consumption of energy during the final evaporation in view of the quantities of water added during the alkalizing process.

SUMMARY OF THE INVENTION

The process according to the invention, in a first step, comprises alkalization without evaporation of water under a pressure of from above 1 atmosphere to 3 atmospheres and, in a second step, evaporation of the water. The advantage of effecting alkalization initially without evaporation of water is that it is possible to work under perfectly controlled conditions and to retain the water for a desired period: the same quantity of water thus being available throughout the entire alkalization reaction, which promotes the treatment of the polyphenols largely responsible for the red colour, the bitterness, the chocolate taste and the pigment solubility of the cocoa. The cocoa and the alkalizing agent dissolved in water are thus introduced into a closed vessel and heated, care being taken at the beginning of the reaction to allow the carbon dioxide formed during the reaction to escape, and the reaction is continued with vigorous stirring in the closed vessel under a pressure of from above 1 atmosphere to 3 atmospheres. In order to create this excess pressure, air, compressed air or an oxygen-containing gas mixture is introduced into the reaction mixture throughout or during part of the alkalization time. Working under excess pressure has a favourable effect in assisting the cocoa to develop a more intense red coloration.

Since alkalization is carried out under controlled conditions, the aroma quality and colour of the cocoa may be selected by varying any of the parameters of the alkalization reaction, namely the alkali content, the water content, the alkalization and evaporation temperature and the alkalization time.

The process according to the invention gives a cocoa which develops a good aroma and of which the pH tends towards neutral, the pigments of the cocoa powder obtained being characterized by good solubility which has an economic advantage in regard to the colouring power, enabling a more intense coloration to be obtained for a smaller cocoa content than with conventional cocoa powders.

DETAILED DESCRIPTION OF THE INVENTION

The process according to the invention may be applied both to the meal and to the liquor in the roasted or non-roasted state. Alkalization is carried out with sodium, potassium, ammonium or magnesium hydroxide or carbonate, preferably with potassium carbonate. The alkali content used is from 1 to 3% by weight, based on the weight of the cocoa.

A content above 3% does nothing in regard to the red coloration and, on the other hand, increases the pH. A content below 1% does not give a sufficiently alkaline medium. The alkali is preferably used in a quantity of from 2 to 2.5% by weight, based on the weight of the cocoa.

The alkali is dissolved in water before its incorporation in the cocoa mass. According to the invention, the water content is from 10 to 50% by weight, based on the weight of the cocoa, in the case of the liquor and from 10 to 100% in the case of the meal.

It is inherent in the nature of the starting material that more water is used for the treatment of meal because it absorbs water to 70% of its own weight. By contrast, less water is used for the treatment of liquor and a higher temperature is used for its evaporation. It is of course uneconomical to use too high a water content because this would increase the consumption of energy for evaporation. The preferred water content is from 10 to 25%, based on the weight of the cocoa, in the treatment of liquor and from 60 to 80% in the treatment of meal.

The alkalization temperature is below 110° C. This is because at a higher temperature, as in known processes, the cocoa is less dark and the red coloration absent. Alkalization is preferably carried out at a temperature of from 60° to 100° C.

Compared with the process according to EP 66 304, the process according to the invention enables the alkalization time to be considerably shortened. The alkalization time is from 30 minutes to 4 hours. A long alkalization time tends to reduce the pH, to intensify the coloration and to develop a good red colour of the cocoa.

In the process according to the invention, alkalization is initially carried out—as mentioned above—in a closed vessel, after which the vessel is opened and the water is evaporated. Evaporation of the water takes place as quickly as possible at a temperature of from 70° to 120° C. either in the same vessel as used for alkalization or in another vessel. A higher temperature may optionally be briefly applied towards the end of evaporation. In that case, cocoa having a moisture content of 2% or less is obtained.

Despite the relatively large quantity of alkali used, the cocoa thus obtained is free from the alkaline taste characteristic of cocoas obtained by known processes. On completion of alkalization, the cocoa mass is conventionally treated to convert it into cakes and cocoa powder ready for marketing.

The cocoa powder thus obtained has a pH of from 6.8 to 8.5 which is interesting because it is known that an acidic cocoa has a weaker colouring power than a neutral or slightly alkaline cocoa. On the other hand, the aqueous extract of this powder has an optical density at 20° C. of from 0.6 to 1.3 (as measured on a 1% solution in a 1 cm cell at a wavelength of 490 nm). For comparison, the extract of an ordinary brown cocoa powder has an optical density, as measured under the same conditions, of from 0.2 to 0.5.

The process according to the invention enables cocoa to be produced in colours ranging from red to dark brown without a high energy consumption. In conventional industrial processes, alkalization is accompanied by the evaporation of water from the beginning of the treatment and it is for this reason that a higher temperature is generally applied. This results in continuous variation of the alkalization conditions, the treatment time being determined by the time necessary to evaporate the water. Another disadvantage of these known processes is that they cannot be adapted to meet the specific requirements of various qualities of cocoa and cocoa nibs.

The cocoa powder thus obtained may of course be used for numerous applications, i.e., for chocolate-flavoured beverages, in chocolate manufacture, in confectionary, in deep-frozen foods and other applications for which its advantages as explained above make it highly desirable.

The process according to the invention is illustrated by the following Examples.

EXAMPLES

Because the colour of the cocoa or cocoa powder is of considerable importance in accordance with the invention, it is necessary to define the parameters by which that colour may be measured. A Philips PYE UNICAM SP 8-100 spectrophotometer equipped with an attachment for measuring colour and connected to an HP 85 computer was used for this purpose. This spectrocolorimeter measures the spectrum of the light reflected by a sample placed in a cell. The intensity of the light is measured for each wavelength. This information enables the trichromatic values X,Y,Z to be obtained. All the colours may be calibrated as a function of the trichromatic values. To be represented in one plane, the trichromatic coordinates x,y,z have to be calculated from the trichromatic values. To represent the difference in colour between two samples, the values L,a,b have to be calculated: L represents the brightness, a the red component (a>0) and b the yellow component (b>0).

The value L varies from 0 (black) to 100 (white). The closer it comes to zero, the darker the cocoa. So far as the red is concerned, the higher the ratio a:b, the more red the colour of the cocoa.

EXAMPLE 1

250 g roasted cocoa liquor coming from a production line were preheated in a laboratory mixer. 5 g potassium carbonate dissolved in 50 g hot water were added to and mixed with the cocoa mass. The mixer was hermetically closed with a cover and the temperature adjusted to 100° C. A pressure was created inside the mixer by connection to compressed air. The pressure was adjusted to 2 km/cm$^2$, these conditions being maintained for 3 hours. Thereafter, to dry the cocoa mass, an opening was formed in the cover of the mixer, enabling the water to evaporate. The temperature inside the reactor was increased to 120° C. and the mass was dried for 2 hours to a final moisture content of <2%.

The colour of the cocoa mass was darker than usual with a reddish tint. Nevertheless, the pH did not exceed 7.2.

COMPARISON EXAMPLE 1

A cocoa liquor was mixed with a potassium carbonate solution as described in Example 1. The mass was then treated as in the conventional industrial process, i.e., the mixer was heated to 130° C. and was not closed. The water thus evaporated in approximately 2 hours.

The colour of the mass was typically brown and the pH did not fall below 7.8.

The results of the colour measurements of the alkalized cocoa mass confirmed the visual observation. It is obvious that the same difference in colour is encountered in the cocoa powders prepared from these masses.

|  | pH | L | a | b | a:b |
|---|---|---|---|---|---|
| Example 1 | 7.2 | 2.06 | 5.59 | 3.23 | 1.73 |
| Comparison Example 1 | 7.8 | 6.03 | 9.40 | 7.21 | 1.30 |

The colour (L,a,b) of the cocoa mass was measured with a PYE UNICAM spectrophotometer by melting the cocoa mass in the cell.

EXAMPLE 2

3 kg green (=non-roasted) meal were granulated (diameter 2 mm) and then mixed with 3 kg water—in which 75 g K$_2$CO$_3$ had been dissolved—in a kneader. The temperature was adjusted to 80° C. (double-jacket heating) and the kneader was closed with a cover. An excess pressure was created inside the kneader with compressed air. After an alkalization time of 2 hours, the meal was transferred to an air dryer, dried at a temperature of 80° C. (for approximately 1.5 to 2 hours) and then roasted for 20 minutes at 120° C.

A cocoa powder was produced by the usual operations (pressing, grinding, sieving and conditioning).

Results of tasting of the cocoa powder: very pleasant colour—fairly dark, distinct brown-red. Organoleptic quality: very well developed cocoa taste, highly appreciated aroma.

Results of colour measurement of the cocoa powder: L=25.83, a=15.18, b=10.95, a:b=1.38.

COMPARISON EXAMPLE 2

The procedure was as described in Example 2, except that no pressure was applied in the kneader. On the other hand, alkalization was continued for 6 hours.

Results of tasting of the cocoa powder: colour brown tending towards red, weaker, flat, less developed, unclean taste of cocoa.

Results of the colour measurement of the powder: L=30.53, a=13.46, b=11.74, a:b=1.15.

In these Examples, L,a and b were determined by placing the cocoa powder directly in the measuring cell.

Through these comparison tests, it was shown that an air pressure above atmospheric pressure during alkalization advantageously replaces a long alkalization time which is necessary for the good development of colour and taste at low temperature.

Among the commercial cocoa powders measured for colour by the same method, none was as dark (L>33) or as red (a:b<0.9).

EXAMPLE 3

The cocoa powder produced as described in Example 2 was used in confectionary to improve the colour of cake. The confectioner then carried out a comparison test with a cocoa powder typically used for production of cake. The result according to the confectioner was quite spectacular. The new cocoa had given a much more intense and warmer colour tending towards brown-red.

It was estimated that, by using the new powder, the normal cocoa dose of 4.3% (based on the weight of the cake) could be reduced to 2.9% for the same result. This represents a saving of approximately 30%.

EXAMPLE 4

(a) A red cocoa powder (1 g), such as described in Example 2, was dispersed in water (100 ml). After filtration (0.45 μm), a strongly coloured aqueous cocoa extract was obtained. The absorption of this extract was measured with a PYE UNICAM SP 8-100 spectrophotometer at a wavelength of 490 nm (absorption maximum). Result: O.D.=1.09 (1 cm cell)

The extract of an ordinary (brown) cocoa powder was prepared for comparison and measured for absorption: Result: O.D.=0.27 (1 cm cell)

The solubility in water of the pigments of a cocoa powder according to the invention shows a distinct improvement over ordinary powders. This is of considerable advantage in practice because large amounts of cocoa powder are used for the Production of cocoa-flavored beverages.

(b) The cocoa powders were dispersed in hot water (70° C.) After filtration, absorption was measured with the following results:

red cocoa (according to the invention): O.D.=1.44
brown cocoa (ordinary): O.D.=0.47

The solubility of the pigments is even higher at elevated temperature, which is an advantage for hot cocoa beverages. The consumer is attracted by a rich cocoa colour.

I claim:

1. A process for alkalizing cocoa for improving taste and dispersibility and for obtaining alkalized cocoa having a range of colors in shades of red and brown comprising:
    mixing nad heating cocoa and an alkalizing agent dissolved in water in an enclosed vessel at a temperature below 110° C. under a pressure in the vessel of from above 1 atmosphere to 3 atmospheres without evaporation of water while introducing an oxygen-containing gas during at least a part of the mixing and heating to maintain the pressure of from above 1 atmosphere to 3 atmospheres for alkalizing the cocoa; and then
    evaporating the water from the alkalized cocoa.

2. A process as claimed in claim 1 wherein the alkalizing agent is in an amount of from 1% to 3% by weight based on the weight of the cocoa.

3. A process as claimed in claim 2 wherein the amount of alkalizing agent is from 2% to 2.5% by weight based on the weight of the cocoa.

4. A process as claimed in claim 1 or 2 wherein the cocoa and water containing the dissolved alkalizing agent are heated to a temperature of from 60° C. to 100° C.

5. A process as claimed in claim 1 or 2 wherein the cocoa is alkalized for from 30 minutes to 4 hours.

6. A process as claimed in claim 1 or 2 wherein the cocoa is a cocoa liquor and the water containing the dissolved alkalizing agent is in an amount of from 10% to 50% by weight based upon the weight of the cocoa.

7. A process as claimed in claim 1 or 2 wherein the cocoa is a cocoa meal and the water containing the dissolved alakalizing agent is in an amount of from 10% to 100% by weight based upon the weight of the cocoa.

8. A process as claimed in claim 1 or 2 wherein the cocoa is a cocoa liquor and the water containing the dissolved alkalizing agent is in an amount of from 10% to 25% by weight based upon the weight of the cocoa.

9. A process as claimed in claim 1 or 2 wherein the cocoa is a cocoa meal and the water containing the dissolved alkalizing agent is in an aount of form 60% to 80% by weight based upon the weight of the cocoa.

10. A process as claimed in claim 1 or 2 wherein the cocoa and the water containing the dissolved alkalizing agent are mixed by stirring.

11. A process as claimed in claim 1 or 2 wherein the water is evaporated at a temperature of from 70° C. to 120° C.

12. A process as claimed in claim 1 or 2 wherein the alkalized cocoa has a pH of from 6.8 to 8.5 and wherein a 1% aqueous solution of the alkalized cocoa in a 1 cm cell has an optical density of from 0.6 to 1.3 as measured at 20° C. and at a wavelength of 490 nm.

13. A process as claimed in claim 1 wherein the water is evaporated until the cocoa has a moisture content of about 2% by weight.

14. A process as claimed in claim 1 further comprising allowing escape of carbon dioxide form the vessel.

15. A process as claimed in claim 1 wherein the alkalizing agent is selected from the group consisting of hydroxides and carbonates of sodium, potassium, ammonium and magnesium.

16. A process as claimed in claim 1 wherein the cocoa is selected from the group consisting of cocoa meal and cocoa liquor.

* * * * *

UNITED STATES PATENT AND TRADEMARK OFFICE
CERTIFICATE OF CORRECTION

PATENT NO. : 4,784,866

DATED : Nov. 15, 1988

INVENTOR(S) : Ulrich WISSGOTT

It is certified that error appears in the above-identified patent and that said Letters Patent is hereby corrected as shown below:

Column 1, line 49, "its" should be --it--.

Column 4, line 17, "km" should be --kg--.

Column 5, line 52, "Produotion" should be --production--.

Column 6, line 3, [Claim 1, line 5] "nad" should be --and--.

Column 6, line 40, [Claim 9, line 3] "aount of form" should be --amount of from--.

Column 6, line 57, [Claim 14, line 2] "form" should be --from--.

Signed and Sealed this

Ninth Day of May, 1989

Attest:

DONALD J. QUIGG

Attesting Officer

Commissioner of Patents and Trademarks